US012743323B2

(12) United States Patent
Sanderson

(10) Patent No.: US 12,743,323 B2
(45) Date of Patent: Sep. 22, 2026

(54) LIVE MIGRATION OF RUNNING APPLICATIONS BETWEEN COMPUTER SYSTEMS

(71) Applicant: Microsoft Technology Licensing, LLC, Redmond, WA (US)

(72) Inventor: Steven Sanderson, Bristol (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 18/191,794

(22) Filed: Mar. 28, 2023

(65) Prior Publication Data

US 2024/0330075 A1 Oct. 3, 2024

(51) Int. Cl.
*G06F 9/50* (2006.01)

(52) U.S. Cl.
CPC .................................. *G06F 9/5088* (2013.01)

(58) Field of Classification Search
CPC . G06F 9/5088; G06F 2209/482; G06F 9/4856
See application file for complete search history.

(56) References Cited

U.S. PATENT DOCUMENTS 10,884,790 B1 * 1/2021 Saidi .................. G06F 12/1027
2011/0099318 A1 * 4/2011 Hudzia .............. G06F 9/45533 718/1
2023/0023452 A1 * 1/2023 Baskakov ............ G06F 3/0679
2023/0259341 A1 * 8/2023 Zhang .................. G06F 9/5072 717/148

OTHER PUBLICATIONS

International Search Report and Written Opinion received for PCT Application No. PCT/US2024/019328, Jun. 19, 2024, 16 pages.
International Preliminary Report on Patentability received for PCT Application No. PCT/US2024/019328, mailed on Oct. 9, 2025, 11 pages.
U.S. Appl. No. 19/648,241, filed Apr. 15, 2026.
Communication pursuant to Article 94(3) Received for European Patent Application No. 24717917.9, mailed on Jun. 15, 2026, 06 pages.

* cited by examiner

*Primary Examiner* — Sisley N Kim
(74) *Attorney, Agent, or Firm* — Workman Nydegger

(57) ABSTRACT

A first device initiates a template state phase of executing an executable file comprising portable bytecode, including supplying a non-deterministic value request with a deterministic value. After completing the template state phase, the first device generates a memory snapshot for a set of memory pages used by the executable file. The first device then initiates an operational phase of executing the executable file, including generating a memory delta comprising each mutation to the memory pages since the snapshot point. The first device exports the memory delta to a second device. The second device initiates the template state phase of executing the executable file, including supplying a non-deterministic value request with the deterministic value. After completing the template state phase, the second device applies the memory delta to the memory pages used by the executable file and continues the execution of the executable file.

20 Claims, 4 Drawing Sheets

100

Computer System 101a (e.g., Server)
Processor System 102a
Memory 103a
Memory Snapshot 112a
Memory Delta 113a
Storage Media 104a
Runtime 108a
Live Migration 109a
Execuable File 110
Memory Delta 111a
Bus 106a
Network Interface 105a Network 107

Computer System 101b (e.g., Client)
Processor System 102b
Memory 103b
Memory Snapshot 112b
Memory Delta 113b
Storage Media 104b
Runtime 108b
Live Migration 109b
Execuable File 110
Memory Delta 111b
Bus 106b
Network Interface 105b

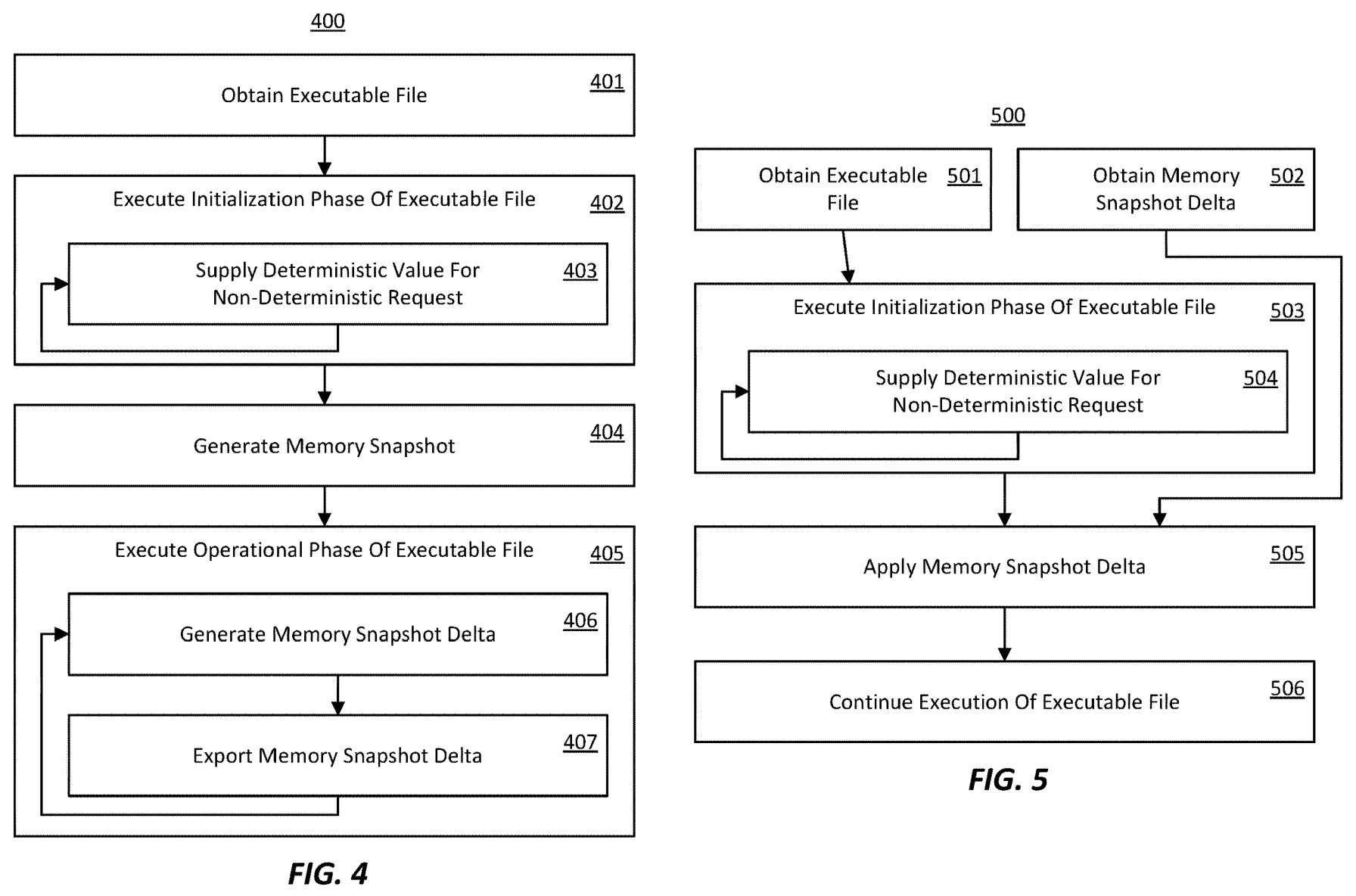

500

Obtain Executable File 501

Obtain Memory Snapshot Delta 502

Execute Initialization Phase Of Executable File 503

Supply Deterministic Value For Non-Deterministic Request 504

Apply Memory Snapshot Delta 505

Continue Execution Of Executable File 506

Obtain Executable File 401

Execute Initialization Phase Of Executable File 402

Supply Deterministic Value For Non-Deterministic Request 403

Generate Memory Snapshot 404

Execute Operational Phase Of Executable File 405

Generate Memory Snapshot Delta 406

Export Memory Snapshot Delta 407

FIG. 4

LIVE MIGRATION OF RUNNING APPLICATIONS BETWEEN COMPUTER SYSTEMS

BACKGROUND OF THE INVENTION

In computing, an executable file (often referred to as an "executable" or a "binary") comprises binary code instructions that a computer processor executes. Classically, executable files contained binary-code instructions selected from an instruction set of a target processor instruction set architecture (ISA). As such, these executable files are executed natively on processors implementing the executable files' target ISA. Such executable files are natively executable only on processors implementing the executable files' target ISA. Additionally, software often targets a particular application binary interface (ABI), such as an ABI provided by a specific operating system (OS). In addition to being natively executable only on processors implementing their target ISA, such executable files are also natively executable only on computer systems running an OS that implements the executable files' target ABI.

More recently, executable files comprise bytecode instructions, a form of instruction set designed for execution by a software interpreter rather than by a processor directly. The use of bytecode reduces hardware and OS dependence by allowing the same code to run cross-platform on different devices having different OS ABIs and different processor ISAs. WebAssembly defines a portable bytecode ISA for use in developing applications that run on web pages, with a design goal of enabling near-native code execution speed in a web browser. WebAssembly executables can be executed on a variety of OSs and processor ISAs, using a runtime environment that includes a low-level virtual stack machine. While WebAssembly was initially designed for execution within a web browser, it has been applied to more generalized contexts, with its virtual stack machine being embedded into host applications and standalone runtime environments.

The subject matter claimed herein is not limited to embodiments that solve any disadvantages or that operate only in environments such as those described supra. Rather, this background is only provided to illustrate one example technology area where some embodiments described herein may be practiced.

SUMMARY OF THE INVENTION

In some aspects, the techniques described herein relate to methods, systems, and computer program products, including: obtaining an executable file including portable bytecode; initiating a template state phase of execution of the executable file, including, during the template state phase, supplying a non-deterministic value request by the executable file with a deterministic value; and after completing the template state phase, generating a memory snapshot for a set of memory pages used by the executable file; initiating an operational phase of the execution of the executable file, including, during the operational phase, generating a memory delta including each mutation to the set of memory pages since the memory snapshot; and exporting the memory delta.

In some aspects, the techniques described herein relate to methods, systems, and computer program products, including: obtaining an executable file including portable bytecode; obtaining a memory delta for the executable file; initiating a template state phase of execution of the executable file, including, during the template state phase, supplying a non-deterministic value request by the executable file with a deterministic value; and after completing the template state phase, applying the memory delta to a set of memory pages used by the executable file; and after applying the memory delta to the set of memory pages, continuing the execution of the executable file.

In some aspects, the techniques described herein relate to methods, systems, and computer program products, including: a first computer system obtaining an executable file including portable bytecode; the first computer system initiating a template state phase of execution of the executable file, including, during the template state phase, the first computer system supplying a non-deterministic value request by the executable file with a deterministic value; and after completing the template state phase, the first computer system generating a memory snapshot for a set of memory pages used by the executable file; the first computer system initiating an operational phase of the execution of the executable file, including, during the operational phase, the first computer system presenting a user interface (UI) to a client device; and the first computer system generating a memory delta including each mutation to the set of memory pages since the memory snapshot; and the first computer system exporting the memory delta to a second computer system; and the second computer system obtaining the executable file; the second computer system obtaining the memory delta for the executable file from the first computer system; the second computer system initiating the template state phase of the execution of the executable file, including, during the template state phase, the second computer system supplying the non-deterministic value request by the executable file with the deterministic value; and after completing the template state phase, the second computer system applying the memory delta to the set of memory pages used by the executable file; and after applying the memory delta to the set of memory pages, the second computer system continuing the execution of the executable file; and the second computer system presenting the UI to the client device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To describe the manner in which the advantages and features of the systems and methods described herein can be obtained, a more particular description of the embodiments briefly described supra will be rendered by reference to specific embodiments thereof, which are illustrated in the appended drawings. Understanding that these drawings depict only typical embodiments of the systems and methods described herein and are not, therefore, to be considered to be limiting in their scope, certain systems and methods will be described and explained with additional specificity and detail through the use of the accompanying drawings in which:

FIG. 4 illustrates a flow chart of an example method for exporting an application execution session; and FIG. 5 illustrates a flow chart of an example method for importing an application execution session.

DETAILED DESCRIPTION OF THE INVENTION

Figure 1:
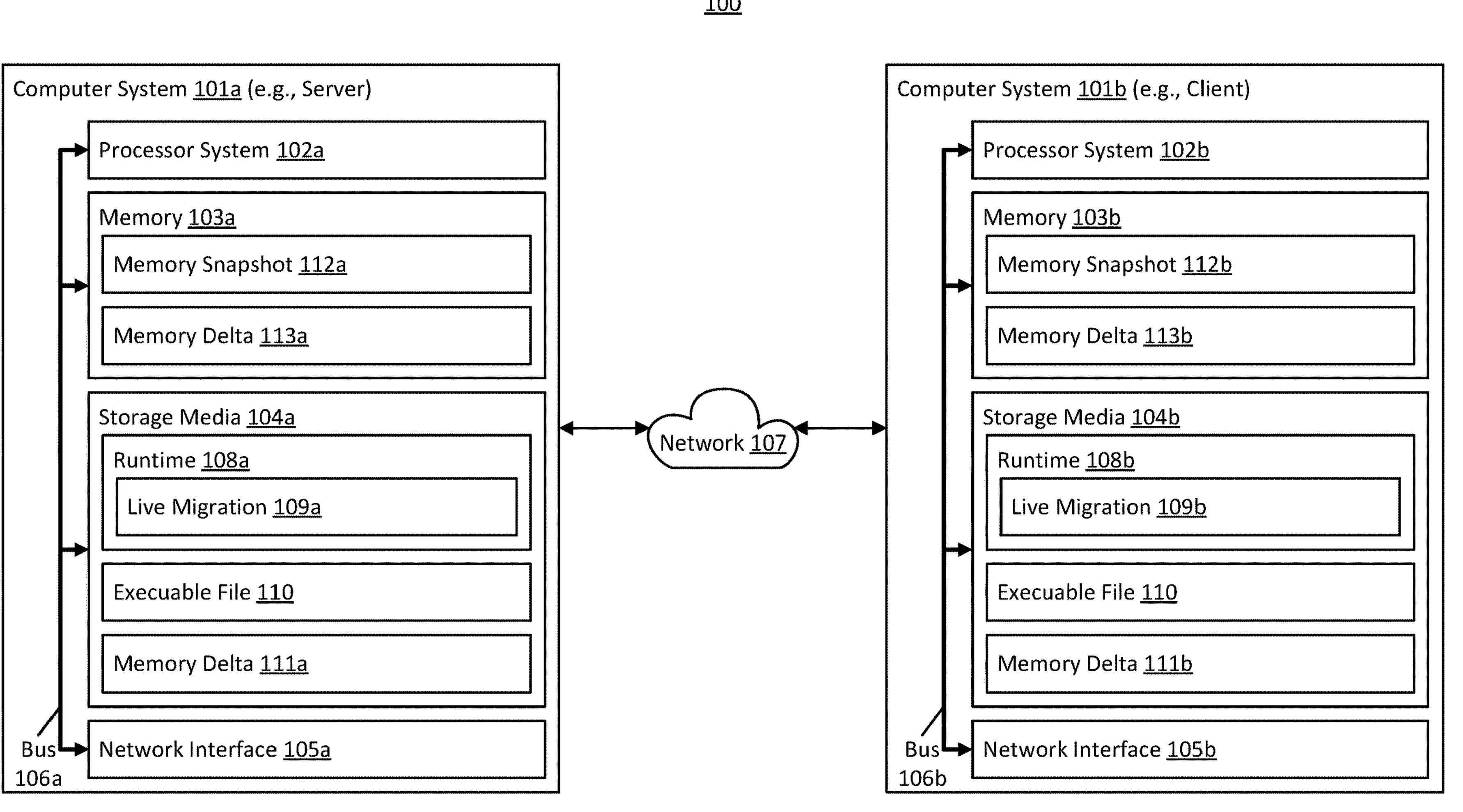
FIG. 1 illustrates an example of a computer architecture that facilitates the live migration of running applications between computer systems.

Presently, executable files-including bytecode-based executables such as WebAssembly applications—are launched, run, and terminated at a single computer system. Thus, the lifecycle of an application's execution session occurs entirely on a single computer system. An application's execution session includes a computer system (e.g., via an operating system or runtime) creating a set of memory pages (e.g., memory space) for use by the application; the computer system executing the executable file's code (e.g., binary code or bytecode) within the context of those memory pages, resulting in mutations to the state of those memory pages; and the computer system freeing those memory pages when application's execution session is terminated. While an application may store some state from its memory pages to persistent storage during its execution (e.g., for use during a later execution session), the contents of the memory pages associated with a given execution session are lost at the conclusion of the session.

At least some embodiments described herein enable the live migration of running applications between computer systems, extending their execution lifecycle over multiple computer systems while providing a seamless user interface (UI) experience. Embodiments initiate the execution of an application on a first computer system, including executing a template state phase of the application's executable file on the first computer system. During that template state phase, embodiments supply the application with a deterministic value for any non-deterministic value requested. As examples, embodiments supply zero for a time request, supply zero for a random number request, and supply an empty indicator (e.g., no files present) for a disk access request. In embodiments, after the template state phase, the application's template memory state is snapshotted, and the application continues to execute on the first computer system in an operational phase. Based on the snapshot, embodiments track any mutations that the application makes to its memory space during this operational phase, resulting in a memory delta versus the application's template memory state that can be exported to persistent storage or exported to another computer system.

Embodiments also initiate the execution of the application on a second computer system, including executing the template state phase of the application's executable file on the second computer system and supplying the same deterministic value(s) for any non-deterministic value(s) requested (e.g., time request, random number request, disk access request). By supplying the same deterministic values during the template state phase on the second computer system as those supplied at the first computer system, the application's memory space at the second computer reaches a byte-for-byte identical state as the template memory state at the first computer system. Notably, execution of the template state phase on the second computer system can be prior to, concurrent with, or after the execution of the template state phase on the first computer system.

Embodiments transfer the execution of the application from the first computer system to the second computer system based on the template memory state generated on the second computer system and based on the memory delta generated on the first computer system. Embodiments import the memory delta that was exported by the first computer system to the second computer system (e.g., by loading the memory delta from persistent storage by receiving the memory delta from the first computer system). Embodiments then apply that memory delta to the application's memory space on the second computer system, which re-creates the mutations that the application made to its template memory space during its operational phase of execution on the first computer system. After applying the memory delta to the application's memory space on the second computer system, embodiments continue the execution of the application on the second computer system, effectively migrating the application's execution session to the second computer system. Some embodiments track further mutations that the application makes on the second computer system to its memory space versus the template memory state, resulting in a memory delta that can be exported to persistent storage or exported to another computer system.

In some embodiments, the first computer system is different from the second computer system. In these embodiments, the first computer system exports the memory delta to the second computer system, and the application's execution session is continued on the second computer system. In these embodiments, after the export of the memory delta to the second computer system is complete, the application is terminated on the first computer system.

In embodiments, during the execution of the operational phase on the first computer system, the application sends a UI to the second computer system. Then, during its execution on the second computer system, the application presents the UI at the second computer system. In one example, the first computer system is a server, and the second computer system is a client device (e.g., desktop, laptop, tablet, phone). In this example, when executing on the server, the application sends its UI to the client device for remote presentation on the client device. Then, when executing on the client device after the transfer, the application presents the UI on the client device. In another example, the first computer system is the client device, and the second computer system is the server. In this example, when executing on the client device, the application presents the UI on the client device. Then, when executing on the server after the transfer, the application sends its UI to the client device for remote presentation on the client device.

In other embodiments, whether executing on the first computer system or on the second computer system, the application sends its UI to a third computer system for remote presentation on the third computer system. In one example, the first computer system is a first server (e.g., a regional data center server), the second computer system is a second server (e.g., an edge server), and the third computer system is a client device. In this example, when executing on either the first server or the second server, the application sends its UI to the client device for remote presentation on the client device.

In embodiments, in any of these examples, the transition of the presentation of the UI by the first computer system to the presentation of the UI by the second computer system occurs in timeframes imperceptible by a human user. Thus, embodiments provide a seamless experience to a user, such that the user may not be aware that the application they are interacting with has been transferred from one computer system to another.

In some embodiments, the first computer system and the second computer system are the same computer system. In these embodiments, the computer system exports the memory delta to persistent storage, terminates the execution of the application on the computer system, and later resumes execution of the application on the computer system based on the persisted memory delta. In these embodiments, the application sends its UI to a third computer system for remote presentation at the third computer system. For example, the first computer system and the second computer system are both the same server, and the third computer system is a client device. In this example, the server "suspends" the application when it is determined that a user is not actively interacting with the application, freeing server resources (e.g., memory resources, processing resources). Then, when the user begins to interact with the application again, the server seamlessly "resumes" the application. In some embodiments, resumption of the application occurs in timeframes imperceptible by a human user, such that suspension and resumption of the application occur in a manner imperceptible to the user.

In some embodiments, an application can be transferred between any number of computer systems and in any direction. In one example, a web application begins execution at a regional data center server, sending its UI to a client device. Later, the web application's execution session is transferred to an edge server located nearer to the client device (e.g., to reduce latency between the application and the client device, to reduce resource usage at the regional data center server). Sometime after that, the execution session is transferred to the client device itself (e.g., to reduce latency further, to reduce resource usage at the edge server). Based on the application's performance at the client device, it is determined that the client device is not powerful enough to provide a satisfactory user experience, so the web application's execution session is transferred back to the edge server and/or to the regional data center server. In embodiments, each of these transfers is seamless to a user of the client device.

In some embodiments, an application can be suspended/resumed at any computer system it operates on. Continuing the foregoing example, after the user has stopped interacting with the web application (e.g., for a predetermined amount of time), the web application's execution session is suspended on the server (e.g., by persisting a memory delta to disk and terminating the application) and is later resumed when user activity has resumed (e.g., by starting the web application and executing it through its template state phase, and then applying the persisted memory delta). In embodiments, this suspension/resumption is imperceptible to the user of the client device.

The embodiments herein provide several technical benefits. As just demonstrated, embodiments enable an application to live-migrate between computer systems, which provides the ability to optimize a user experience (e.g., by reducing UI latency), and provides the ability to manage computer system resources (e.g., by freeing resources at a server computer when an application is migrated away, or when the application is suspended). Additionally, the embodiments herein enable server loads to be managed on a per-user basis (e.g., per-application), allowing an individual user's application to go offline or migrate away. This contrasts with other workload migration techniques, such as virtual machines, in which an entire logical machine (including a whole operating system and applications executing thereon) serving a plurality of users is migrated. Additionally, for developers who want to enable workloads to transition from one computer system to another, the embodiments herein free developers from needing to worry about implementing application logic to serialize out live state.

FIG. 1 illustrates an example of a computer architecture 100 that facilitates the live migration of running applications between computer systems. As shown, computer architecture 100 includes computer system 101*a* and computer system 101*b*. Each computer system 101*a*, 101*b* comprises, correspondingly, a processor system 102*a*, 102*b* (e.g., a single processor, or a plurality of processors); a memory 103*a*, 103*b* (e.g., system or main memory); a storage media 104*a*, 104*b* (collectively, storage media 104; e.g., a single computer-readable storage medium, or a plurality of computer-readable storage media); and a network interface 105*a*, 105*b* (e.g., one or more network interface cards), all interconnected by a bus 106*a*, 106*b*. As shown, computer system 101*a* and computer system 101*a* are interconnected via network 107.

The storage media 104*a* and 104*b* are each illustrated as storing computer-executable instructions implementing a runtime 108*a*, 108*b* (collectively, runtime 108). In embodiments, these runtimes are identical, though there could be variations (e.g., different versions, server-focused versus client-focused). The storage media 104*a* and 104*b* are each also illustrated as storing a corresponding copy of an executable file 110, which is executable within runtime 108. In some embodiments, executable file 110 comprises bytecode instructions. While a variety of bytecode-based executable file formats exist, in some embodiments, executable file 110 comprises a WebAssembly application. While WebAssembly is provided as a concrete example herein, the live migration principles described herein could be applied to a variety of application models and executable file formats, as will be explained infra.

The storage media 104 are each illustrated as storing computer-executable instructions implementing a live migration component 109*a*, 109*b* (collectively, live migration component 109). Like runtime 108, in embodiments, these live migration components are identical, though there could be variations (e.g., different versions, server-focused versus client-focused). In the embodiment illustrated in FIG. 1, live migration component 109 is part of runtime 108. However, in other embodiments, the live migration component 109 is separate from runtime 108. In embodiments, live migration component 109 operates to migrate an application execution session based on executable file 110 from one computer system to another computer system (e.g., from computer system 101*a* to computer system 101*b*, or vice versa). In embodiments, this migration is performed in a manner that provides a seamless UI experience to a user interacting with the application. In embodiments, this means that there is no loss of application state or any visible UI interruption.

Figure 2:
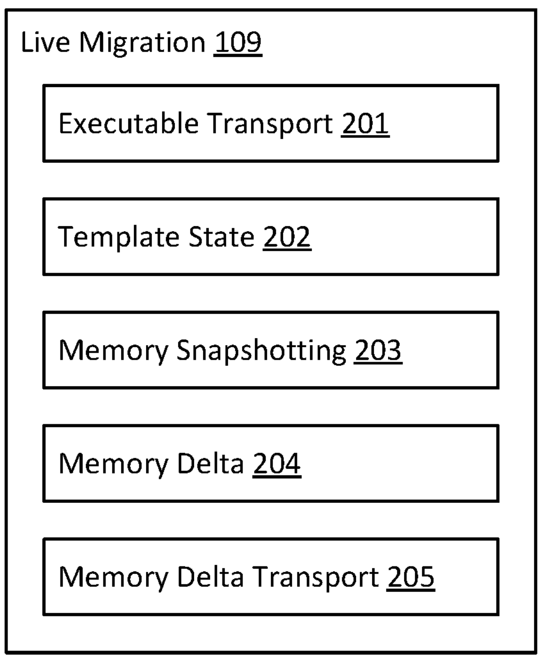
FIG. 2 illustrates an example of a live migration component.

FIG. 2 illustrates an example 200 of live migration component 109 of FIG. 1. Each internal component of the live migration component 109 depicted in FIG. 2 represents various functionalities that the live migration component 109 might implement in accordance with various embodiments described herein. It will be appreciated, however, that the depicted components-including their identity and arrangement—are presented merely as an aid in describing example embodiments of the live migration component 109.

In FIG. 2, the live migration component 109 comprises an executable transport component 201. In embodiments, executable transport component 201 acquires an application executable (e.g., executable file 110) from storage media 104 or over network 107. Taking computer system 101*a* and live migration component 109*a* as an example, in embodiments, executable transport component 201 acquires executable file 110 from storage media 104*a* or from computer system 101*b* when first launching the application or when the application is being migrated from computer system 101*b* to computer system 101*a*. Additionally, in embodiments, executable transport component 201 sends an application executable (e.g., executable file 110) to another computer system over network 107. Continuing with the example of computer system 101*a*, in embodiments, executable transport component 201 sends executable file 110 to computer system 101*b* when migrating the application from computer system 101*a* to computer system 101*b*.

The live migration component 109 also comprises a template state component 202. In embodiments, template state component 202 controls a template state phase of execution of an application's executable. During this template state phase of execution, template state component 202 intercepts non-deterministic application programming interface (API) requests from the application and returns deterministic values for those requests. Examples of non-deterministic API requests include clock-read API requests, random number API requests, and disk access API requests. Examples of deterministic values returned for these non-deterministic API requests include returning zero for all clock-read API requests, returning zero or the same pseudorandom value for all random number requests, and returning an indication that no files are available for all disk access requests. In embodiments, runtime 108 operates such that an application executes deterministically to create a fully reproducible memory state wherever and whenever it runs when the application always receives the same values for non-deterministic API calls during this template state phase. Template state component 202 thus enables an application to be executed at various locations (e.g., computer systems) and at various times, while each time producing a set of memory pages (e.g., at least a subset of the application's memory space) that are initialized by the application with byte-for-byte identical contents. In embodiments, template state component 202 pauses the execution of an application once the application's template state has been reached (so that the application's template memory space can be snapshotted, for example).

WebAssembly is provided herein as an example of executable file 110 because the WebAssembly application model was created with aggressive application sandboxing features (e.g., as a security feature that limits the harm that a malicious WebAssembly application could inflict on a client device when running in a web browser at the client device). Due to this aggressive sandboxing, a WebAssembly application can be presented with the same perception of the "outside world" (e.g., outside of its sandbox) wherever and whenever it is running by intercepting non-deterministic WebAssembly system interface (WASI) calls during the template state phase and supplying deterministic values. Notably, other application models could similarly be capable of producing applications that can be executed deterministically to create a reproducible memory state wherever and whenever they run. Thus, the principles herein are not limited to the use of WebAssembly applications.

The live migration component 109 also comprises a memory snapshotting component 203. In embodiments, after template state component 202 has initialized an application's memory space and has paused execution of the application at its template state, memory snapshotting component 203 generates and stores a memory snapshot of the application's template memory space, including generating a snapshotted copy of each memory page that is part of the application's template memory space. In embodiments, generating a memory snapshot includes generating a snapshot of memory page contents. Additionally, in embodiments, generating a memory snapshot includes generating a snapshot of memory page metadata (e.g., memory page table entries). In FIG. 1, memory snapshots are represented by memory snapshot 112*a* and memory snapshot 112*b*. Notably, because template state component 202 generates byte-for-byte identical contents for each instance of a given application, in embodiments if there are multiple instances of that application running at a given computer system (e.g., an instance of the application per user, as may be the case for a web application), memory snapshotting component 203 only needs to generate and store a single instance of a memory snapshot of that application's template memory space.

The live migration component 109 also comprises a memory delta component 204. In embodiments, after memory snapshotting component 203 has stored a memory snapshot of an application's template memory space, the live migration component 109 resumes the application's execution. Then, memory delta component 204 generates a memory snapshot delta (memory delta) of any mutations that the application makes to its memory space during an operational phase of execution. In some embodiments, memory delta component 204 operates on an ongoing basis during the application's operational phase. In other embodiments, memory delta component 204 operates only when a memory delta needs to be exported for the application (e.g., to persist the application's runtime state to storage or to migrate the application to another computer system). In FIG. 1, memory deltas are represented by memory delta 113*a*, 113*b* (collectively, memory deltas 113). Additionally, FIG. 1 shows that, in embodiments, memory deltas 113 may be exported to persistent storage (e.g., memory delta 111*a*, 111*b*).

In embodiments, memory delta component 204 operates on the basis of copy-on-write memory and uses page write tracking (e.g., using the WriteWatch API on WINDOWS or the mprotect API on LINUX) to track only the deltas from the template memory state. Using these techniques, if there are multiple instances of an application (e.g., each for a different user), each instance of the application is isolated from and independent of the others; however, these instances don't consume any more memory than needed to represent how much that instance has changed from the template. In embodiments, memory delta component 204 represents the mutations to a memory page by applying an exclusive-or (XOR) bit-wise operation between a mutated memory page and a corresponding snapshotted copy of that memory page. By using an XOR operation in this way, unmodified regions within a page become highly compressible zero regions that can be compressed using a lossless compression algorithm. In embodiments, memory deltas 113 represent memory page mutations as the compressed result of these XOR operations. In addition, memory delta component 204 applies a memory delta to a template memory page by decompressing a corresponding memory delta and XOR'ing the decompressed result with the template memory page.

The live migration component 109 also comprises a memory delta transport component 205. In embodiments, memory delta transport component 205 acquires a memory delta from storage media 104 or over network 107. Taking computer system 101*a* and live migration component 109*a* as an example, in embodiments, memory delta transport component 205 acquires memory delta 111*a* from storage media 104*a* when resuming an application's execution session and imports the memory delta 111*a* over network 107 when the application is being migrated from computer system 101*b* to computer system 101*a*. Additionally, in embodiments, executable transport component 201 exports a memory delta to storage media 104 or over network 107. Continuing with the example of computer system 101*a*, in embodiments, executable transport component 201 persists memory delta 111*a* to storage media 104*a* (memory delta 113*a*) when suspending an application's execution session or exports the memory delta 111*a* over network 107 when the application is being migrated from computer system 101*a* to computer system 101*b*.

In embodiments, memory delta transport component 205 transports memory deltas 113 as XOR'ed and compressed modified pages, as described supra in connection with memory snapshotting component 203. In embodiments, this format is sufficiently compressed for efficient transmission so that the mutated memory state can be moved over a consumer internet connection while providing a seamless user experience during the transfer. In an alternative embodiment, memory delta transport component 205 transports a list of bit offsets to toggle within each memory page.

In embodiments, memory delta component 204 and memory delta transport component 205 operate in an iterative manner, such that a user can continue interacting with an application, and mutating state, even while transferred memory deltas are in-flight. In embodiments, each time memory delta transport component 205 completes a transmission, memory delta component 204 determines if there have been further page writes. If so, memory delta component 204 generates a further delta, and memory delta transport component 205 sends that further delta. When operating in this manner, each memory delta tends to be smaller than its antecedent because applications tend to reach a stable state. When there are no more pending memory deltas, the execution of the application is switched to the target system.

In embodiments, applications (e.g., executable file 110) utilize a UI rendering model that works both locally and remotely (e.g., by using runtime 108 to render a UI based on either local or remote UI data). However, in some embodiments, an application does not surface any UI at all.

Figure 3:
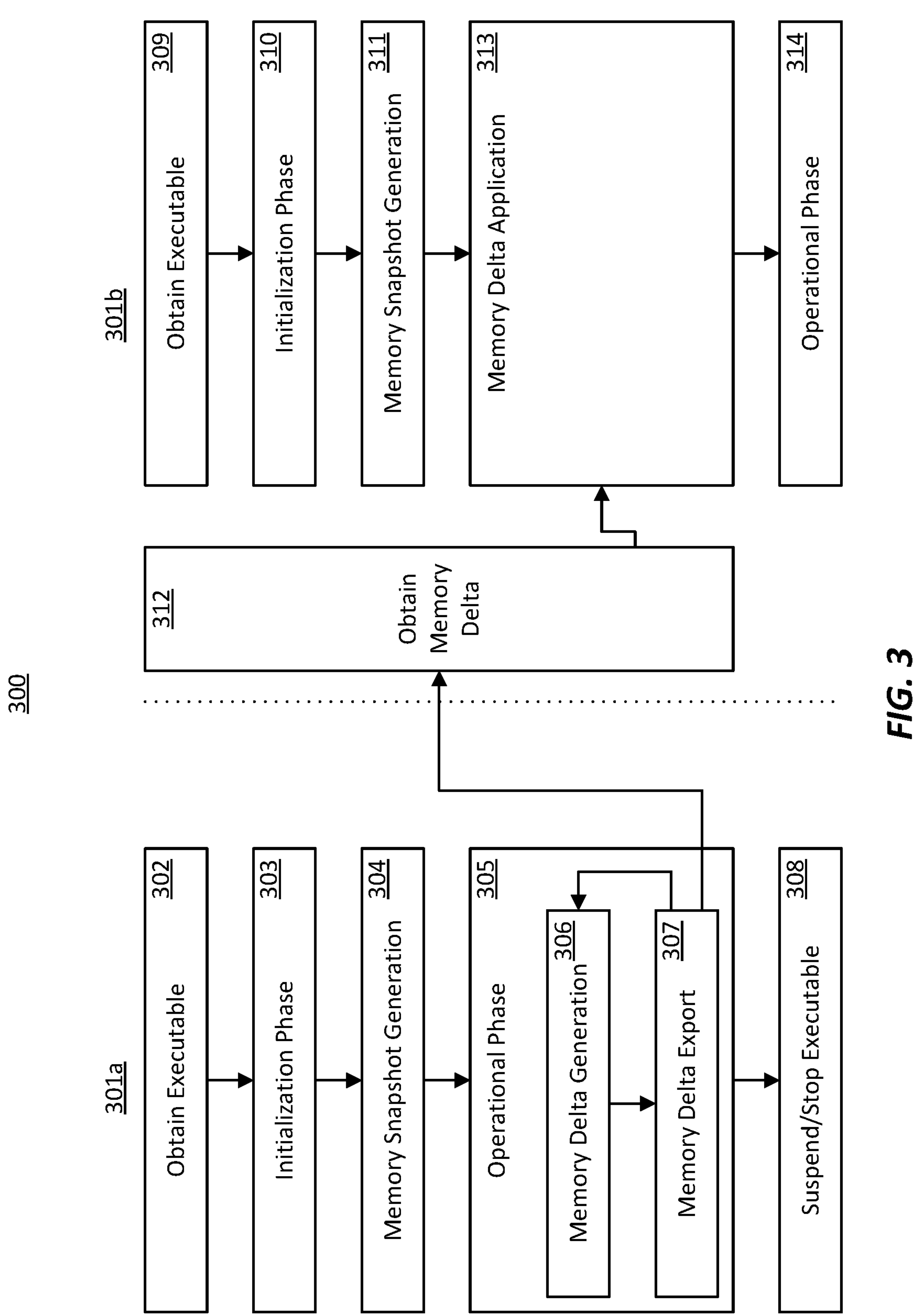
FIG. 3 illustrates an example of the timing of live migration of running applications between computer systems.

FIG. 3 illustrates an example 300 of the timing of live migration of running applications between computer systems. Example 300 includes a flowchart 301*a* of steps performed at computer system 101*a* (e.g., a server device) and a flowchart 301*b* of steps performed at computer system 101*b* (e.g., a client device or even another server device).

With attention directed to flowchart 301*a* and computer system 101*a*, at step 302 (obtain executable), executable transport component 201 obtains executable file 110 (e.g., from storage media 104 or from another computer). At step 303 (initialization phase), template state component 202 controls a template state phase of execution of executable file 110, including intercepting non-deterministic API requests and returning deterministic values, and then pausing the application's execution. After step 303, the application has created its template memory state, and at step 304 (memory snapshot generation), memory snapshotting component 203 generates a snapshot of that template memory state (e.g., memory snapshot 112*a*). At step 305 (operational phase), execution of the application is resumed with memory deltas being generated by memory delta component 204 at step 306 (memory delta generation), and those memory deltas being exported to computer system 101*b* by memory delta transport component 205 at step 307 (memory delta export). As mentioned, in embodiments, memory delta component 204 and memory delta transport component 205 operate in an iterative manner, such that a user can continue interacting with an application, and mutating state, even while transferred memory deltas are in-flight. This is represented by an arrow extending from step 307 to step 306. After all pending memory deltas have been transferred to computer system 101*b* (e.g., the application is operating in a steady state with no more memory mutations), the application is terminated at step 308 (suspend/stop executable).

With attention now directed to flowchart 301*b* and computer system 101*b*, at step 309 (obtain executable), executable transport component 201 obtains executable file 110 (e.g., from storage media 104 or from computer system 101*a*). At step 310 (initialization phase), template state component 202 controls a template state phase of execution of executable file 110, including intercepting non-deterministic API requests and returning deterministic values, and then pausing the application's execution. After step 303, the application has created its template memory state, and at step 311 (memory snapshot generation), memory snapshotting component 203 generates a snapshot of that template memory state (e.g., memory snapshot 112*b*). Notably, step 309 to step 311 could occur at any time prior to the conclusion of step 305 at computer system 101*a* and even prior to step 302.

At step 312 (obtain memory delta), memory delta transport component 205 obtains a memory delta from computer system 101*a*. As shown, step 312 could occur at any time prior to the conclusion of step 305 at computer system 101*a*. Thus, for example, memory delta transport component 205 could begin to obtain memory deltas for executable file 110 concurrent with, or even prior to, obtaining executable file 110. At step 313 (memory delta application), memory delta component 204 applies the received memory deltas to the template state generated by step 310. As shown, memory deltas may continue to be received once the memory delta application has started. Once all memory deltas have been received and applied, at step 314 (operational phase), execution of the application is continued at computer system 101*b*, based on the updated memory state.

Embodiments are now described in connection with FIGS. 4 and 5, which respectively illustrate a flow chart of an example method 400 for exporting an application execution session, and a flow chart of an example method 500 for importing an application execution session. In embodiments, instructions for implementing method 400 and method are encoded as computer-executable instructions (e.g., live migration component 109) stored on a computer storage media (e.g., storage media 104*a*, storage media 104*a*) that are executable by a processor system (e.g., processor system 102*a*, processor system 102*b*) to cause a computer system (e.g., computer system 101*a*, computer system 101*b*) to perform the methods.

The following discussion now refers to methods and method acts. Although the method acts are discussed in specific orders or are illustrated in a flow chart as occurring in a particular order, no specific ordering is required unless expressly stated or required because an act is dependent on another act being completed prior to the act being performed.

Referring to FIG. 4, in embodiments, method 400 comprises act 401 of obtaining an executable file. In some embodiments, act 401 comprises obtaining an executable file comprising portable bytecode. For example, at computer system 101*a*, executable transport component 201 obtains executable file 110 from storage media 104 or over network 107. Thus, in embodiments, obtaining the executable file in act 401 comprises one of obtaining the executable file from local persistent storage or obtaining the executable file from a remote computer system. While a variety of application models could be used, in embodiments, the executable file is a WebAssembly binary.

Although not illustrated, in embodiments, method 400 also comprises creating an execution environment for the executable file using, for example, runtime 108. In some embodiments, runtime 108 can create multiple runtime instances for the same executable file, such as one per user.

Method 400 also comprises act 402 of executing a template state phase of the executable file. For example, executable transport component 201 initiates the execution of executable file 110. In embodiments, initiating the template state phase of the execution of the executable file comprises initiating the execution of the executable file within the execution environment.

Act 402 comprises act 403 of supplying a deterministic value for a non-deterministic request. In embodiments, act 403 comprises, during the template state phase, supplying a non-deterministic value request by the executable file with a deterministic value. For example, template state component 202 intercepts API calls (e.g., WASI calls) requesting non-deterministic values and supplies deterministic values for those calls. In embodiments, template state component 202 intercepts a plurality of API calls, as indicated by an arrow showing that act 403 could occur repeatedly. In embodiments, template state component 202 provides the same deterministic value for each type of non-deterministic call. This means that, in act 403, supplying the non-deterministic value request by the executable file with the deterministic value comprises supplying the deterministic value for a plurality of non-deterministic value requests having a common request type. Thus, in embodiments, supplying the non-deterministic value request by the executable file with the deterministic value comprises identifying a non-deterministic value request type and identifying the deterministic value based on the non-deterministic value request type.

Method 400 also comprises act 404 of generating a memory snapshot. In embodiments, act 404 comprises, after completing the template state phase, generating a memory snapshot for a set of memory pages used by the executable file. For example, memory snapshotting component 203 generates memory snapshot 112*a*, comprising a copy of a set of memory pages used by executable file 110 after the completion of the initialization phase (e.g., when the executable file 110 has created a template memory state based on the operation of template state component 202).

Method 400 also comprises act 405 of executing an operational phase of the executable file. For example, the live migration component 109 resumes execution of executable file 110 after completion of the memory snapshot. In some embodiments, during this operational phase, execution of the executable file produces a UI, which may be displayed locally (e.g., at computer system 101*a*) or can be streamed to a remote computer system (e.g., computer system 101*b*). For example, if computer system 101*b* is a client device, the UI is streamed to computer system 101*b*. Thus, in embodiments, method 400 comprises, during the operational phase of the execution of the executable file, presenting a UI to a client device.

Act 405 comprises act 406 of generating a memory delta. In embodiments, act 406 comprises, during the operational phase, generating a memory delta comprising each mutation to the set of memory pages since the memory snapshot. For example, memory delta component 204 generates memory delta 113*a*, either in an ongoing manner during the operational phase or once a migration to computer system 101*b* is requested. In embodiments, generating the memory delta comprises tracking each mutation of the set of memory pages since the memory snapshot. In an example, memory delta component 204 operates on the basis of copy-on-write memory and uses page write tracking (e.g., using the Write-Watch API on WINDOWS or the mprotect API on LINUX) to track only the deltas from the template memory state snapshotted in act 404. In embodiments, generating the memory delta comprises comparing each memory page, in the set of memory pages, that has been mutated since the memory snapshot with a corresponding snapshotted copy. For example, once a memory page mutation has been detected, embodiments compare that memory page to a snapshotted copy. In embodiments, comparing each memory page, in the set of memory pages, that has been mutated since the memory snapshot with the corresponding snapshotted copy comprises, for each memory page that has been mutated since the memory snapshot, generating a bitmask using an XOR bit-wise operation between the memory page and the corresponding snapshotted copy. Embodiments may then use a lossless compression algorithm to compress the result.

Act 405 also comprises act 407 of exporting the memory delta. In one example, memory delta transport component 205 persists memory delta 113*a* to storage media 104 (e.g., memory delta 111*a*). Thus, in embodiments, exporting the memory delta comprises persisting the memory delta to local persistent storage. In another example, memory delta transport component 205 sends memory delta 113*a* to computer system 101*b* over network 107. Thus, in embodiments, exporting the memory delta comprises sending the memory delta to a remote computer system.

As described in connection with FIG. 3, in embodiments, generating the memory delta and exporting the memory delta is performed iteratively until mutations to the set of memory pages cease. In FIG. 4, this is indicated by an arrow extending from act 407 to act 406.

Referring to FIG. 5, in embodiments, method 500 comprises act 501 of obtaining an executable file. For example, at computer system 101*b*, executable transport component 201 obtains executable file 110 from storage media 104 or over network 107 (e.g., from computer system 101*a*). Thus, in embodiments, obtaining the executable file in act 501 comprises one of obtaining the executable file from local persistent storage or obtaining the executable file from a remote computer system. While a variety of application models could be used, in embodiments, the executable file is a WebAssembly binary.

Although not illustrated, in embodiments, method 400 also comprises creating an execution environment for the executable file using, for example, runtime 108. In some embodiments, runtime 108 can create multiple runtime instances for the same executable file, such as one per user.

Method 500 also comprises act 502 of obtaining a memory delta. In embodiments, act 502 comprises obtaining a memory delta for the executable file. In one example, memory delta transport component 205 obtains memory delta 111*b* from storage media 104 (e.g., loaded into memory as memory delta 113*b*). Thus, in embodiments, obtaining the memory delta for the executable file comprises obtaining the memory delta from local persistent storage. In another example, memory delta transport component 205 receives memory delta 113*b* from computer system 101*a* over network 107 (e.g., memory delta 113*a* sent by computer system 101*a*). Thus, in embodiments, obtaining the memory delta for the executable file comprises obtaining the memory delta from a remote computer system. As shown, there is no ordering requirement for act 502 when compared to act 501 and act 503. Thus, in embodiments, act 502 could be performed prior to act 501, after act 503, or in parallel with act 501 and/or act 503.

Method 500 also comprises act 503 of executing a template state phase of the executable file. For example, executable transport component 201 initiates the execution of executable file 110. In embodiments, initiating the template state phase of the execution of the executable file comprises initiating the execution of the executable file within the execution environment.

Act 503 comprises act 504 of supplying a deterministic value for a non-deterministic request. In embodiments, act 504 comprises, during the template state phase, supplying a non-deterministic value request by the executable file with a deterministic value. For example, template state component 202 intercepts API calls (e.g., WASI calls) requesting non-deterministic values and supplies deterministic values for those calls. In embodiments, template state component 202 intercepts a plurality of API calls, as indicated by an arrow showing that act 504 could occur repeatedly. In embodiments, template state component 202 provides the same deterministic value for each type of non-deterministic call. This means that, in act 504, supplying the non-deterministic value request by the executable file with the deterministic value comprises supplying the deterministic value for a plurality of non-deterministic value requests having a common request type. Thus, in embodiments, supplying the non-deterministic value request by the executable file with the deterministic value comprises identifying a non-deterministic value request type and identifying the deterministic value based on the non-deterministic value request type.

Although not shown, in some embodiments, method 500 includes generating a memory snapshot, like act 404 of method 400. Thus, in embodiments, method 500 further comprises, after completing the template state phase, generating a memory snapshot for the set of memory pages used by the executable file.

Method 500 also comprises act 505 of applying the memory delta. In embodiments, act 505 comprises, after completing the template state phase, applying the memory delta to a set of memory pages used by the executable file. For example, memory delta component 204 applies memory delta 113*b* to the memory state generated after act 503. In embodiments, applying the memory delta to the set of memory pages used by the executable file comprises applying a set of XOR bitmasks to the set of memory pages.

As described in connection with FIG. 3, in embodiments, receiving and applying memory deltas is performed iteratively until mutations to the set of memory pages cease. Thus, in embodiments, obtaining the memory delta and applying the memory delta to the set of memory pages used by the executable file is performed in iterative steps.

Method 500 also comprises act 506 of continuing the execution of the executable file. In embodiments, act 506 comprises, after applying the memory delta to the set of memory pages, continuing the execution of the executable file. For example, the live migration component 109 resumes execution of executable file 110, based on the memory state applied at act 505.

In some embodiments, after continuing execution, execution of the executable file produces a UI, which may be displayed locally (e.g., at computer system 101*b*) or can be streamed to a remote computer system. For example, if computer system 101*b* is a client device, the UI is displayed locally at computer system 101*b*. Thus, in embodiments, method 500 comprises, after continuing the execution of the executable file, presenting a UI to a client device.

In some embodiments, memory delta component 204 continues to create memory deltas so that the application can be migrated to another computer system or suspended at this computer system. Thus, in embodiments, after continuing the execution of the executable file, method 500 comprises generating a new memory delta comprising each mutation to the set of memory pages since the memory snapshot and exporting the new memory delta.

Embodiments of the disclosure may comprise or utilize a special-purpose or general-purpose computer system (e.g., computer system 101*a*, 101*b*) that includes computer hardware, such as, for example, a processor system (e.g., processor system 102*a*, 102*b*) and system memory (e.g., memory 103*a*, 103*b*), as discussed in greater detail below. Embodiments within the scope of the present disclosure also include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media (e.g., storage media 104*a*, 104*b*). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can be used to carry program code in the form of computer-executable instructions or data structures, and which can be accessed by a general-purpose or special-purpose computer system. A "network" is defined as one or more data links that enable the transport of electronic data between computer systems and other electronic devices. When information is transferred or provided over a network or another communications connection (either hardwired, wireless, or a combination of hardwired or wireless) to a computer system, the computer system may view the connection as transmission media. Combinations are included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105*a*, 105*b*) and then eventually transferred to computer system RAM and/or to less volatile computer storage media at a computer system. Thus, computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a function or group of functions. Computer-executable instructions may be, for example, binaries, intermediate format instructions such as assembly language, or even source code.

It will be appreciated that the disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (laaS). The cloud computing model may also be deployed using different deployment models such as private cloud, community cloud, public cloud, hybrid cloud, and so forth.

Some embodiments, such as a cloud computing environment, may comprise a system that includes one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor system, comprising:

obtaining an executable file comprising portable bytecode that is executable within a runtime environment of a host operating system, the portable bytecode being independent of an instruction set architecture of the processor system;

initiating a template state phase of execution of the executable file, wherein, during the template state phase, the runtime environment, executes initialization instructions of the portable bytecode;

intercepts a system interface call resulting from execution of the initialization instructions, wherein the system interface call returns a non-deterministic value; and returns a deterministic value in response to the system interface call; and after completing the template state phase, generating a memory snapshot for a set of memory pages used by the executable file, the memory snapshot defining a deterministic template memory state created by execution of the portable bytecode;

initiating an operational phase of the execution of the executable file, including, during the operational phase, generating a memory delta comprising each mutation to the set of memory pages relative to the deterministic template memory state; and exporting the memory delta.

2. The method of claim 1, wherein the method further comprises, during the operational phase of the execution of the executable file, presenting a user interface (UI).

3. The method of claim 2, wherein presenting the UI comprises presenting the UI to a client device.

4. The method of claim 1, wherein generating the memory delta comprises tracking each mutation of the set of memory pages since the memory snapshot.

5. The method of claim 1, wherein generating the memory delta comprises comparing each memory page, in the set of memory pages, that has been mutated since the memory snapshot with a corresponding snapshotted copy.

6. The method of claim 5, wherein comparing each memory page, in the set of memory pages, that has been mutated since the memory snapshot with the corresponding snapshotted copy comprises, for each memory page that has been mutated since the memory snapshot, generating a bitmask using an exclusive-or (XOR) bit-wise operation between the memory page and the corresponding snapshotted copy.

7. The method of claim 1, wherein exporting the memory delta comprises one of:

persisting the memory delta to local persistent storage; or sending the memory delta to a remote computer system.

8. The method of claim 1, wherein generating the memory delta and exporting the memory delta is performed iteratively until mutations to the set of memory pages cease.

9. A method, implemented at a computer system that includes a processor system, comprising:

obtaining an executable file comprising portable bytecode that is executable within a runtime environment of a host operating system, the portable bytecode being independent of an instruction set architecture of the processor system;

obtaining a memory delta for the executable file;

initiating a template state phase of execution of the executable file, wherein, during the template state phase, the runtime environment executes initialization instructions of the portable bytecode and, during execution of the initialization instructions, intercepts non-deterministic system interface calls and substitutes deterministic values for those calls, thereby generating a deterministic template memory state created by execution of the portable bytecode; and after completing the template state phase, applying the memory delta to a set of memory pages used by the executable file relative to the deterministic template memory state; and after applying the memory delta to the set of memory pages, continuing the execution of the executable file.

10. The method of claim 9, wherein the method further comprises, after continuing the execution of the executable file, presenting a user interface to a client device.

11. The method of claim 9, wherein obtaining the executable file comprises one of:

obtaining the executable file from local persistent storage; or obtaining the executable file from a remote computer system.

12. The method of claim 9, wherein obtaining the memory delta for the executable file comprises one of:

obtaining the memory delta from local persistent storage; or obtaining the memory delta from a remote computer system.

13. The method of claim 9, wherein the method further comprises, after completing the template state phase, generating a memory snapshot for the set of memory pages used by the executable file;

after continuing the execution of the executable file, generating a new memory delta comprising each mutation to the set of memory pages since the memory snapshot; and exporting the new memory delta.

14. The method of claim 9, wherein applying the memory delta to the set of memory pages used by the executable file comprises applying a set of exclusive-or (XOR) bitmasks to the set of memory pages.

15. The method of claim 9, wherein obtaining the memory delta and applying the memory delta to the set of memory pages used by the executable file is performed in iterative steps.

16. A system, comprising:

a first computer system, comprising a first processor system and a first computer storage medium that stores first computer-executable instructions that are executable by the first processor system to at least:

obtain an executable file comprising portable bytecode that is executable within a runtime environment of a host operating system, the portable bytecode being independent of an instruction set architecture of the first processor system;

initiate a template state phase of execution of the executable file, wherein, during the template state phase, the runtime environment, executes initialization instructions of the portable bytecode;

intercepts a system interface call resulting from execution of the initialization instructions, wherein the system interface call returns a non-deterministic value; and returns a deterministic value in response to the system interface call; and after completing the template state phase, generate a memory snapshot for a set of memory pages used by the executable file, the memory snapshot defining a deterministic template memory state created by execution of the portable bytecode;

initiate an operational phase of the execution of the executable file, including, during the operational phase, presenting a user interface (UI) to a client device; and generating a memory delta comprising each mutation to the set of memory pages relative to the deterministic template memory state; and export the memory delta to a second computer system; and the second computer system, comprising a second processor system and a second computer storage medium that stores second computer-executable instructions that are executable by the second processor system to at least:

obtain the executable file;

obtain the memory delta for the executable file from the first computer system;

initiate the template state phase of the execution of the executable file, wherein, during the template state phase, the runtime environment executes initialization instructions of the portable bytecode and, during execution of the initialization instructions, intercepts non-deterministic system interface calls and substitutes deterministic values for those calls, thereby generating a deterministic template memory state created by execution of the portable bytecode; and after completing the template state phase, apply the memory delta to the set of memory pages used by the executable file relative to the deterministic template memory state; and after applying the memory delta to the set of memory pages, continue the execution of the executable file; and
present the UI to the client device.

17. The system of claim 16, wherein generating the memory delta comprises tracking each mutation of the set of memory pages since the memory snapshot.

18. The system of claim 16, wherein generating the memory delta comprises comparing each memory page in the set of memory pages that has been mutated since the memory snapshot with its corresponding snapshotted copy.

19. The system of claim 16, wherein the second computer-executable instructions that are executable by the second processor system, after completing the template state phase, to:

generate a memory snapshot for the set of memory pages used by the executable file;

after continuing the execution of the executable file, generate a new memory delta comprising each mutation to the set of memory pages since the memory snapshot; and export the new memory delta.

20. The system of claim 16, wherein applying the memory delta to the set of memory pages used by the executable file comprises applying a set of exclusive-or (XOR) bitmasks to the set of memory pages.

* * * * *